Sept. 15, 1936.  P. A. KINZIE  2,054,259
ROTOR VALVE
Filed Sept. 13, 1932  5 Sheets-Sheet 1

Sept. 15, 1936.   P. A. KINZIE   2,054,259
ROTOR VALVE
Filed Sept. 13, 1932   5 Sheets-Sheet 4

Sept. 15, 1936.  P. A. KINZIE  2,054,259
ROTOR VALVE
Filed Sept. 13, 193  5 Sheets—Sheet 5

Patented Sept. 15, 1936

2,054,259

UNITED STATES PATENT OFFICE 2,054,259

ROTOR VALVE

Phillip A. Kinzie, Denver, Colo., assignor to Universal Hydraulic Corporation, Denver, Colo., a corporation of Colorado Application September 13, 1932, Serial No. 633,005

22 Claims. (Cl. 137—139)

This invention relates to valves of the rotary plug type as described in my copending application, Serial No. 609,904, filed May 7, 1932; and, while intended for the same general field of use and application as broadly outlined therein, and using the same general principles of functioning as those therein described and illustrated, is markedly different in its construction and the manner in which the above mentioned principles are applied.

An object of this invention is to provide a rotatable plug type valve of but few parts which are simple, rugged and of economical construction, the whole assembly being such as to easily withstand very high working pressures with but a nominal amount of material and to provide the movable main element with a prime mover capable of producing opening or closure positively and surely, under the most adverse conditions, and still have a surplus of force in reserve.

Another object of the invention is to provide a rotatable plug valve including control elements which positively and automatically raise and release the movable element from its wedge locking tapered seat before any rotary movement of such element is made possible in either a closing or opening direction and which bring the rotary movement of that element to rest prior to forcing it into its tapered cylindrical bore, thereby protecting the mating fluid-sealing surfaces of the valve from wear to which they would otherwise be subjected were they to be forcibly rotated while in contact one with the other.

Another object of the invention is to provide a valve of the type last stated and in which the movable element will respond to either manual or automatic control with but a minimum of force being applied to the controlling mechanism to secure such response.

A further object of the invention is to provide a self-contained valve which is compact and requires no separate mounting for either the controlling or actuating members of its assembly.

These and other objects and advantages of the invention will become apparent from the following specification when taken with the accompanying drawings in which:

Before proceeding to a detailed description of this embodiment of the invention, particular attention is directed to the fact that, while a valve of but nominal size is illustrated and described herein, the invention is well adapted to employment in large size installations where the rotatable plug may weigh many thousands of pounds. In such installations the several elements of the valve may be constructed in sections which are bolted or otherwise secured to each other, but, for clearness and simplicity, such sectional constructions are not illustrated in this application as the detailed construction of the elements may be varied to suit special requirements and does not constitute an essential feature of this invention.

The several views are therefore to be understood as being typical illustrations for a valve of small size, and are not intended as detail or shop drawings for the construction of valves of extremely large sizes.

The valve as illustrated is adapted, however, for extra severe service; it being designed for high working pressure, and for that reason heavy ribbing is employed on the valve casing to distribute the stresses produced by this pressure.

As indicative of the contemplated larger size units, certain applications of the novel valve constructions will be specified. The valve is adapted for use as a throttling stop valve in a city water main and, with appropriate connections from the main to the operating motor, as a check valve in a city water main; as a shut-off valve in a penstock adjacent to a turbine; as a synchronous relief valve for a turbine; as a free discharge regulating valve at the outlet end of a conduit leading through a dam and/or for the control of water or other fluid flow in large quantities and under heavy pressures.

Figures 1, 2, 5, 6:
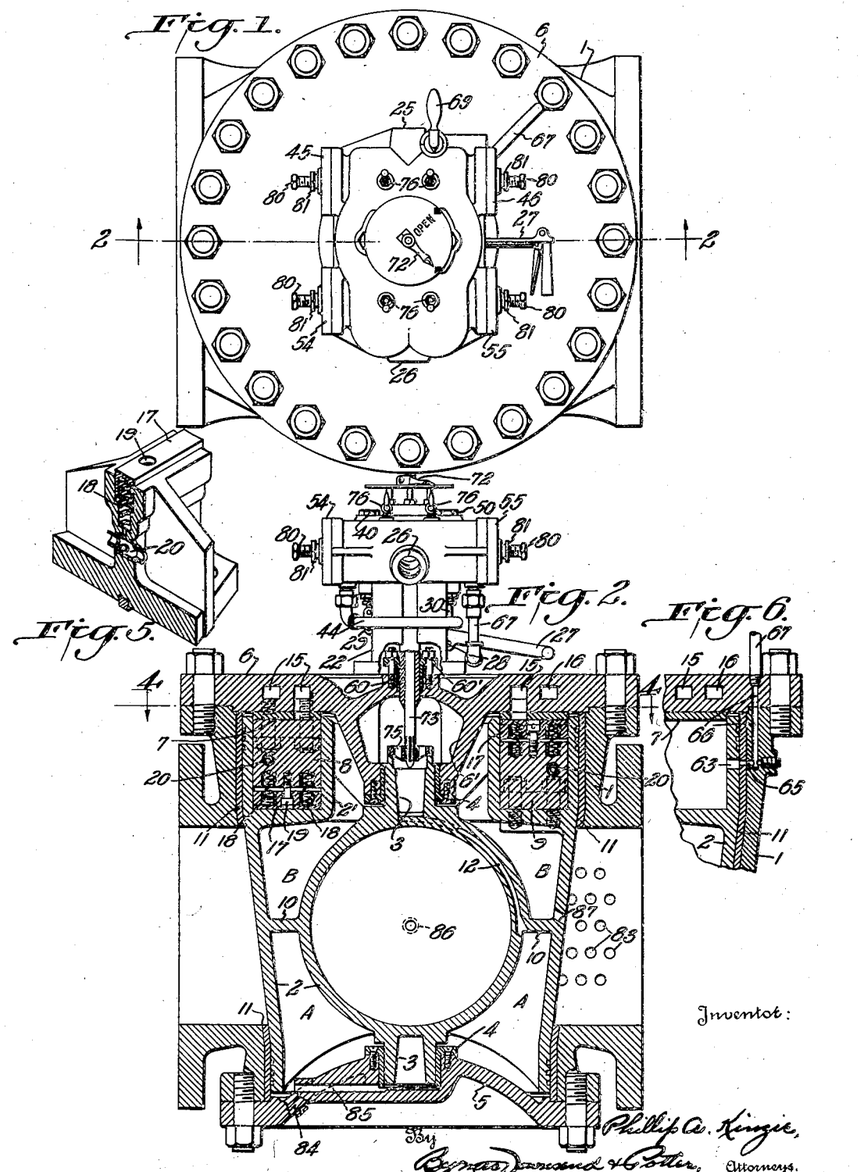
Fig. 1 is a plan view of a rotor valve and valve actuating mechanism embodying the invention.
Fig. 2 is a vertical longitudinal section of the valve on line 2—2 of Fig. 1, the valve being shown in fully closed position, and with the actuating mechanism shown in elevation.
Fig. 5 is a sectional, perspective view through one of the impeller blades.
Fig. 6 is a fragmentary vertical section on line 6—6 of Fig. 4.
Figure 3:
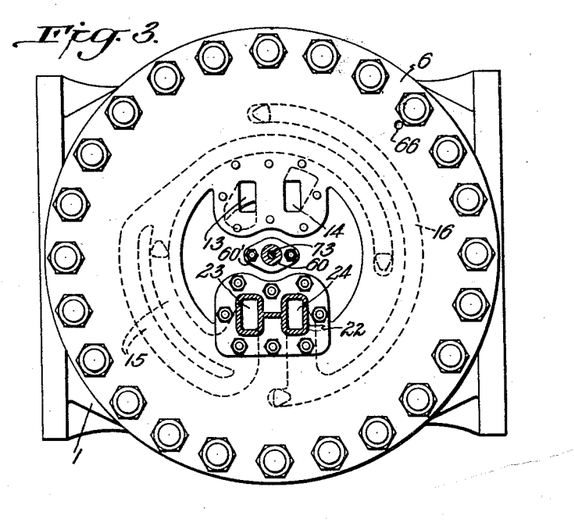
Fig. 3 is a horizontal section taken substantially on line 3—3 of Fig. 1, and comprises, in effect, a top plan view of the valve.

In the drawings, the reference numeral 1 identifies the main shell or valve casing which has an axial cylindrical bore constituting the fluid passageway and a transverse, intersecting bore of tapered form in which the valve plug 2 is rotatably positioned, the plug 2 having a fluid passageway therethrough which, when the plug is turned 90° from the position shown in Fig. 2, registers with the cylindrical bore of shell 1 to form a continuous cylindrical passageway through the valve. Hubs or journals 3 are provided on the axis of rotation of the plug or valve element 2 which are mounted in the cylindrical bearing surfaces of non-corrodible bushings 4, the lower one of which is mounted in the domed or dished head 5 whose upper face is concentrically shouldered in and closes the lower end of the bore within which the valve element 2 is mounted, while the other bushing 4 is carried by the upper head 6 which is provided with a downwardly projecting cylindrically tapered extension in whose lower extremity said bushing is fitted. These bushings may be retained in their respective heads 5 and 6 by forcing them to place, or preferably are held in position by countersunk screws through their flanged faces, the said screws being threadably received in tapped holes in the heads 5 and 6 (as illustrated in Fig. 2). The upper head 6 closes off the big end of the intersecting bore within which valve element 2 is mounted, and the control apparatus for raising the valve from its tapered seat, for rotating the valve and then forcing the valve to its seat in its new adjusted position, is supported by and directly upon the upper head 6.

An annular rotor chamber is formed between the head 6 and the valve 2 by the non-corrodible annular ring 7 which is bolted to the lower face of the head 6, and the upper portion of the plug 2, the inner edge of the top cylindrical portion of the outer wall of plug 2 and the outer cylindrical edge of an angular flange 2' within the plug 2 having a close sliding and rotating fit with the peripheral edges of the ring 7. The bottom wall of the flange 2' is a plane surface parallel to the lower face of ring 7, and an annular rotor chamber of rectangular cross-section is thus formed for the reception of impeller blades 8, 9 that are secured, respectively, to the ring 7 and to the valve 2. For convenience of description, the two blades 8 which are bolted through the ring 7 to the head 6 will be referred to as "fixed" blades, while the two blades 9 bolted to the valve 2 will be designated as "movable" blades.

The space within the annular rotor chamber is thus divided into sector shaped chambers for receiving pressure fluid to rotate the valve plug 2. By forming the rotor chamber in the upper end of the valve element 2, its construction is simplified, less metal is required, and outflow from the rotor chambers due to leakage is minimized, likewise the overall height and weight of the completed valve are reduced. Further advantages will be revealed as the description proceeds.

As shown in Fig. 2, the plug or valve element 2 is not made solid but consists of an inner cylindrical wall which forms the fluid passageway and the outer wall of generally tapered form for the major portion of its axial length, these walls merging into each other where the fluid passage approaches to and reaches the outer surface of the plug, and being connected midway of the plug by horizontal transverse webs 10. These webs cooperate with the walls of the plug 2 and the casing heads 5, 6 to divide the space inside the outer walls of the plug into a lower pressure chamber A and an upper pressure chamber B.

The upper and lower end portions of the plug are cylindrical, and these end portions of the plug, as well as the central tapered portion, are received in the matingly fitted surfaces of a non-corrodible liner 11 which is machined on the outside surfaces and pressed tightly into the valve casing 1 and then brazed or welded fast thereto prior to finish boring.

The valve element 2 is made of non-corrodible metal and its upper and lower cylindrical portions described above are guided by the mating cylindrical portions of the liner for axial reciprocation in an upward direction when freeing the plug preparatory to rotating same, and in a downward direction when clamping the plug in its tapered seat after rotation has been accomplished, and the fit between these cylindrical surfaces of the valve element 2 and the ring 7 is made such that this reciprocating and rotary movement of 2 is practically free, while at the same time the axial lengths of these surfaces are such as to prevent any appreciable outflow or leakage between them when pressure fluid is introduced into either chamber A or B, as the case may be. In valves of the larger sizes, this axial movement may be of the order of ½ inch, the lower limit of movement being determined by the wedging engagement of the tapered intermediate portion of the plug 2 on its correspondingly tapered seat in the liner 11 and the upper limit being set by engagement of the radial shoulder at the base of the upper hub 3 with the opposing flange face of upper bearing bushing 4 within which hub 3 is rotatably mounted.

Twin cored passages 12 lead from the cavity in the upper hub 3 downward around the cylindrical wall of the fluid passageway to and through the webs 10 on either side and so communicate with the chamber A below said webs, as shown in Fig. 2, and the passageways communicate with the cylindrical upper open end of the hub 3 which in turn communicates with the cavity in the downward facing tapered hub 6', formed integral with the upper head 6, and this cavity is placed in communication with the control mechanism by a cored port 13 in the head 6, as shown in Fig. 3. Chamber B is placed in direct communication with the control mechanism by means of cored port 14 which passes downward through top cover 6 and opens on the under face of 6 outside the base of the tapered hub 6' thereof, directly into the chamber B.

The head 6 is relatively thick and semiannular passages are cored therein to transfer pressure fluid to and from the rotor chamber. The passage 15 opens, at the lower face of the head 6, into the two chamber sections to which pressure fluid is admitted to close the valve, and passage 16 opens into the other pair of chamber sections.

The two movable impellers 9 are arranged to rotate 90° in a clockwise direction, when viewed from above, for closing the valve, and in counterclockwise rotation when opening the valve. The fixed and movable impellers are of a T shape in cross section as shown in Fig. 5, and midway of their radial length they are provided with transverse ribs which buttress the cantilever leg of the T against fluid pressure acting against either side or radial face thereof, and the finished vertical edge faces of these ribs register with and come into mating contact against the similar ribs on adjacent impellers at either extremity of the 90° arc of rotation in opening or closing and are stopped thereby. The foot of each vertical T leg is increased in thickness and a rectangular slot is machined therethrough radially with respect to the valve's axis of rotation, and into this slot a non-corrodible seal bar 17 is reciprocatingly fitted as shown in Figs. 2 and 5, it being understood that the reciprocating motion of these seal bars is in a vertical direction, parallel with the axis of rotation of valve element 2.

Both the stationary impellers 8 and the movable impellers 9 are fitted with seal bars 17, those in the fixed impellers extending downwards therefrom into sliding contact with the lower face of the rotor chamber, while those in the movable impellers 9 extend upwardly therefrom into sliding contact with the opposing upper face of the annular ring 7, the seal bars of both types of impellers being maintained against their respective surfaces of contact by the coil springs 18. The screws 19, Fig. 6, are screwed tightly into tapped holes in the bottoms of the seal bar slots in the impellers after passing through holes in the seal bars which are made a sliding fit thus permitting the bars to reciprocate vertically, but preventing them from being forced entirely out of their slots, when these parts are being assembled, by the springs 18. The inwardly and outwardly facing radial end faces of both the fixed and movable impellers and their seal bars are accurately bored to make a close turning fit against the inner cylindrical wall and the outer cylindrical wall, respectively, of the rotor chamber.

It will be obvious that when the valve element is lifted vertically off of its tapered cylindrical seat in liner 11, by the admission of fluid pressure into chamber A, such upward movement will decrease the distance between the opposing and parallel faces constituting the top and bottom walls of the rotor chamber. Such decrease in height of the rotor chamber caused by the upward movement of valve element 2, forces the seal bars 17 in both the fixed and movable impellers to recede by a corresponding amount into their respective slots to accommodate this movement, and their springs 18 are consequently compressed in so doing.

These springs now hold their respective seal bars tightly against the plane surfaces which constitute the upper and lower limits of the rotor chamber and so cause the seal bars to provide fluid tight slidable joints where they are thus brought to contact, and in conjunction with the close turning fits provided at their opposing radial ends and their respective impellers with respect to the opposing vertical cylindrical walls of the rotor chamber, provide all the impellers with fluid tight joints on three sides, the fourth side being inherently tight by reason of the impeller bases being held in fluid tight contact with the flat surfaces of ring 7 or flange 2', respectively.

Figure 4:
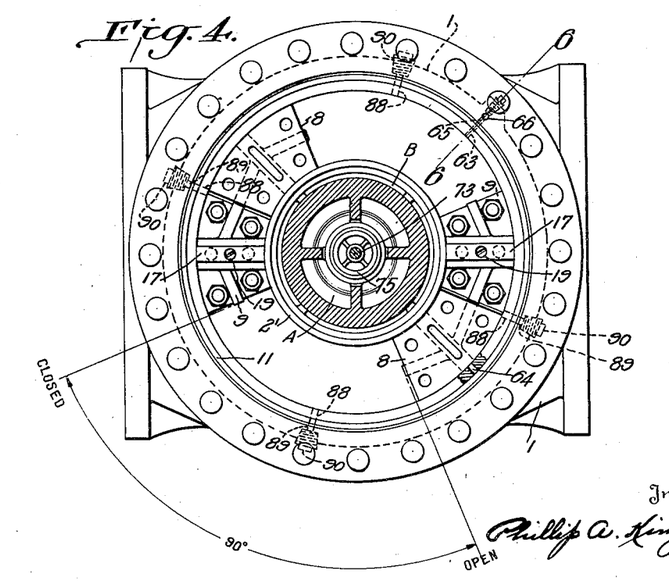
Fig. 4 is a horizontal section taken substantially on line 4—4 of Fig. 2, showing the rotor impeller blades in their relative positions when the valve is fully closed.

As shown in Fig. 4, which is a horizontal section taken at the lower surface of the ring 7, the two stationary impellers 8 are placed diametrically opposite each other in radial alignment, and while two stationary and two movable impellers, together with two opening and two closing rotor chambers, have been described and illustrated, this number can be increased to three or more whenever special conditions make additional power for rotation desirable.

To insure that the seal bars 17 will always remain in sliding contact with their respective engaging surfaces which constitute the upper and lower walls of the rotor chamber, when fluid pressure is present and tending to force these bars against one or the other sides of their slots, as the case may be, a ball valve 20, with twin cage mounting, is provided in both the fixed and movable impellers. These ball valves are so arranged that whenever pressure fluid is acting against either radial face of the impellers, the balls are rolled by that pressure against their opposite seats leaving a passage disclosed to a vertical drilled hole on the axis of one of the springs 18 and the pressure fluid flows therethrough and through the open center of the coil spring into the space between the seal bar face and the bottom of the slot within which the seal bar is received and consequently acts against the inner face area of the seal bar, aiding the springs 18 in forcing the seal bars into engagement with their mating surfaces. These ball valves thus establish fluid pressure beneath the seal bars from whichever side of the impellers such pressure fluid is acting, and at the same time prevent the pressure fluid from passing through the legs of the impellers from the active or pressure side to the inactive or low pressure side.

With the construction and arrangement of the pressure chambers A and B and of the rotor pressure chambers as described and illustrated, a novel and advantageous cycle of operations is made possible, as will now be explained. When pressure fluid is admitted to chamber A through passages 12, as has been described, it is effective over the area comprising the diameter of the lower end of the plug 2, and, acting over this large area, produces an upward force on the plug which lifts it from engagement with its tapered cylindrical seat in liner 11, leaving the plug free for rotation except for the frictional resistance of its upper and lower journals 3, which is nominal, and that of the engagement between the radial shoulder around the base of upper journal 3 and the opposing flange face of the bearing 4 where high bearing pressures are now present, as the full upward force of chamber A is being resisted by this shouldered stop. The first step in the cycle is now complete, and the second starts with admission of pressure fluid into two of the four diametrically opposed rotor pressure chambers to rotate plug 2 in either an opening or closing direction as the case may be.

When pressure fluid is so introduced into these rotor pressure chambers, two distinct forces are produced simultaneously, both of which act upon the valve element 2, the first of these tending to produce rotational movement of plug 2, while the second tends to force the valve plug 2 downwards towards its tapered seat. This second force is produced by the pressure fluid acting between the upper and lower surfaces of the rotor chamber and since its direction is downward and the weight of valve element 2 is likewise in the same direction, the summation of these two downward acting forces relieves the upward pressure of the radial shoulder at the base of upper journal 3 against the flanged face of bushing 4, and the valve element 2 rotates freely and smoothly, the balance of the opposing forces being such as to produce a condition akin to that of a mercury bath thrust bearing floating and supporting the valve element during its cycle of rotary movement.

With the construction and inter-relationship of parts as described, the cycle of operation is as follows:

1. Pressure admitted to chamber A (simultaneously exhausted from chamber B) lifts valve element from tapered seat;

2. Pressure admitted to either of the two pairs of diametrically opposing rotor pressure chambers cancels the major portion of the uplift force from chamber A and then causes valve element to rotate towards or to the open or the closed position, as the case may be, and, after this rotary movement has been completed;

3. Pressure released from rotor chambers and from chamber A, and admitted to chamber B, forces the valve element 2 down into wedging engagement with its tapered seat, locking it in its new position.

The above cycle of functioning of the valve is made to occur in the sequence as given, automatically by means of the control mechanism which will now be described.

The control mechanism consists of a body 21 which is supported on the valve casing by two downwardly extending hollow leg members 22, shown in section in Fig. 4 which are boltedly mounted in fluid tight engagement upon the upper flat finished face or upper head 6. Each of these leg extensions 22 contains two separate vertical cored passages, extending from ports inside the valve body 21, as will be described presently, downward to the flange faces of 22, at the faces of which they matingly register with the ports 13, 14, which lead to chambers A, B, and with the ports or passages 15, 16 that lead to the rotor chamber, and through these vertical cored passages and the ports in 6 just enumerated the pressure and exhaust fluid is carried to and away from chambers A and B and from the rotor pressure chambers in the valve below, and all pressure fluid employed in these chambers first enters the control body 21 through the pressure inlet 25, Fig. 7, while all exhaust fluid released from these chambers flows out of control body 21 through the exhaust outlet 26. Pressure fluid may be supplied to the control at pressure inlet 25 from the conduit upstream from the valve or from any suitable source of pressure supply independent of the conduit.

The control mechanism is manually actuated or caused to function through the agency of the control lever 27, which is pivotally mounted beneath the control body 21 upon the fulcrum pin 28 about the axis of which it swings in a vertical plane.

Angular movement of the lever imparts, through the links 29, vertical reciprocating movement to the two valve stems 30, whose relative positions with reference to the fulcrum pin 28 are such that their movements are always in opposite directions, i. e., when either is moving upwards the other will be moving downwards, likewise their relative distances from the fulcrum pin 28 are such that the one closest to the lever handle moves only about one-half as far as the one attached to the extreme end of the lever. These two valve stems 30 extend upwards into the interior of the control body, entering through the screwed plugs 31 which are provided with fluid tight packing adjusted by gland nuts 32, and at their upper ends are threadedly engaged with the pilot valve 33 and the selector valve 34. The position of the control lever 27 and all the parts of the control mechanism are illustrated in their proper positions for valve element 2 when fully closed. Only the lever 27 and the described parts directly connected thereto are moved through actual manual effort and these being small and hydraulically balanced as well, the force required in accomplishing this is quite small.

The distribution of pressure fluid to the several pressure chambers in response to movement of the pilot valve and selector valve is effected by a clamp-release valve 35, a relay valve 36 and a rotor valve, and these latter valves are actuated in sequence to produce three-stepped cycles of operation noted above. Pressure fluid from any suitable source of supply enters the control body 21 through inlet 25, Fig. 7, and follows the central cored passage around clamp-release valve 35, into the cored passage surrounding the upper end of the relay valve 36, and passes by the diametrically opposed extensions 38 to the pilot valve 33 and selector valve 34. Pressure fluid is therefore always present at the clamp-release valve, the relay valve and at the middle ring ports 39 of the pilot and selector valves, but the relay valve 36 is normally positioned, see Fig. 8, to prevent the flow of pressure fluid to the rotor valve.

Figure 9:
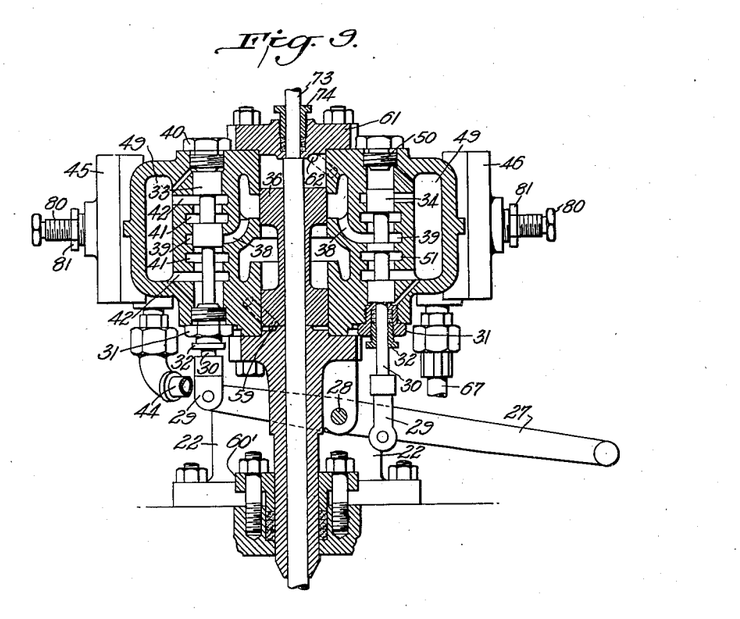
Fig. 9 is a vertical central section taken upon line 9—9 of Fig. 8, Figs. 10 and 11 are fragmentary vertical sections taken, respectively, on lines 10—10 and 11—11 of Fig. 7.
Figure 10:
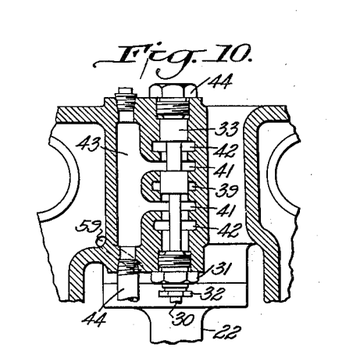

The pilot valve 33 has a relatively long travel between its upper limit, in contact with the screw plug 40, and its lower limiting position in contact with the plug 31, and in whichever of these two limiting positions it is placed, its end spools close off flow of pressure fluid from port 39, while the reduced diameter of its connecting middle portion places the two ringed ports 41 in communication with the two exhaust ports 42. When this pilot valve is moved from one extremity of its travel to the other through the agency of control lever 27, the pressure port 39 is momentarily placed in communication with either the upper or the lower of the two ports 41, Fig. 10, from which it flows into the vertical cored passage 43, while at the same time both exhaust ports 42, Figs. 9 and 10, are momentarily stopped off from communication with passage 43. During the short interval that this condition is established, pressure fluid flows through passage 43 and the communicating pipe 44 into the space between the end face of clamp-release valve 35, Fig. 7, and the opposing face of valve chest head 45, and, acting against the end face of valve 35 as a piston, forces it to travel along its bore until its opposing end face comes into stopping engagement with the central boss of valve chest head 46.

Figure 7:
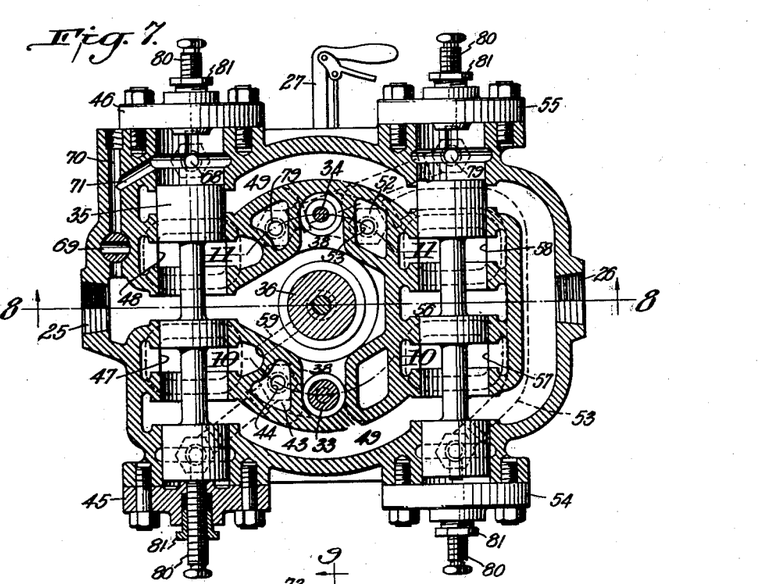
Fig. 7 is an enlarged horizontal section of the control mechanism taken substantially on line 7—7 of Fig. 2.

This shift of position of clamp-release valve 35 from that shown in Fig. 7, admits fluid pressure into release port 47 through which it passes downward through leg 22 to lifting port 13, Fig. 3, and from thence into chamber A, Fig. 2, and causes valve element 2 to rise from its taper seat as previously described. This movement of the valve 35 opens the clamping port 48 into the exhaust passage, the clamping port communicating with the port 14 of chamber B, and thus permits the discharge of fluid from chamber B as the valve member 2 is lifted.

Due to the symmetrical arrangement of pairs of ports 41, 42 at opposite sides of the center of the pilot valve 33, it will be apparent that the described action of causing the clamp-release valve to move to the end of its travel opposite that at which it is shown in Fig. 7 will be accomplished whether the pilot valve 33 is moved to its lower position, as described above, or moved from that lower position to its upper position, as shown in Figs. 9 and 10. These two movements of the pilot valve correspond, respectively, to an upward movement of the lever 27 to open the plug valve and to a downward movement of the lever to close the valve. When in either limiting position, the pilot valve 33 opens direct communication between the space beneath the lower end face (as seen in Fig. 7) of clamp-release valve 35 and the exhaust passage 49, thus permitting the valve 35 to be closed by introducing a pressure fluid between the valve chest head 46 and the opposite end of the valve, as will be described later.

Figure 11:
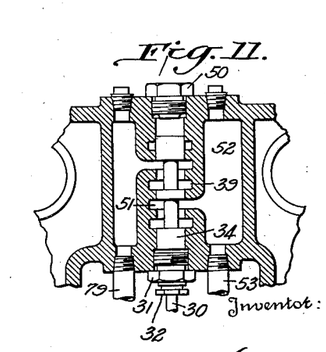

While the pilot valve 33 has been traveling downward and in so doing has, through the agency of valve 35, caused valve element 2 to be lifted from its tapered seat, the selector valve 34 has been traveling upwards in synchronized counter movement by virtue of its connection to the same lever 27, until its upper face comes into stopping engagement with central boss face on the lower end of screw plug 50, and is then in the opposite extreme of its travel from that shown in Figs. 9 and 11. When this shift in position is made, communication is established between pressure port 39 and port 51, and pressure fluid then flows therethrough into the vertical cored passage 52 and downward into communicating pipe 53, Figs. 7 and 11, through which it enters into the space between the valve chest head 54, Fig. 7, and the end face of rotor valve 37, and acting against this face as a piston, forces 37 to travel away from head 54 until its opposite end face comes into stopping engagement with the central boss of valve chest head 55. When this change in position of rotor valve 37 occurs, it is then in the opposite extreme of its travel from that shown in Fig. 7, and its middle ring port 56 is then in communication with opening port 57, which communicates with a vertical cored passage in the second leg 22 of control body 21 and the lower end of this passage registers with port 23, Fig. 3, which communicates with the cored ring passages 15, in upper head 6, which terminate in the two diametrically opposed round cornered, triangular shaped ports which, extending through the under face of cover 6 and ring 7, open into the two rotor pressure chambers which cause anti-clockwise rotation or opening movement of valve element 2 whenever pressure fluid is introduced therein.

In this position of the rotor valve 37, the closing port 58, which communicates with the ring passage 16 that opens into the other pair of rotor chambers, is opened into the exhaust passage 49 of the control casing 21.

Figure 8:
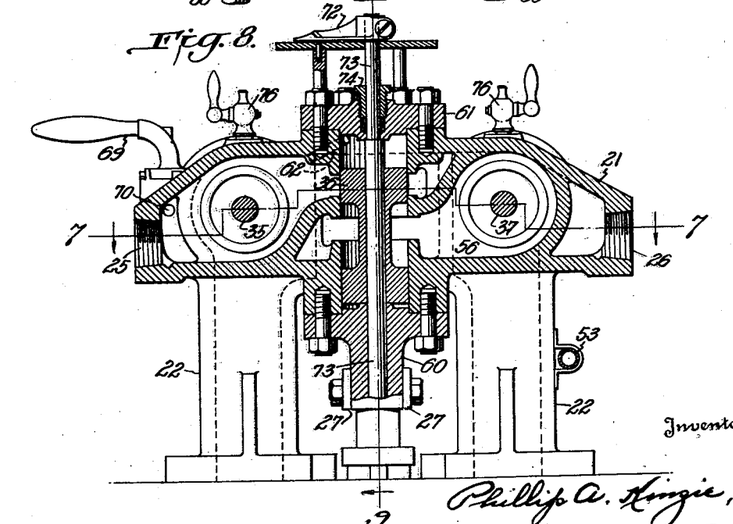
Fig. 8 is a vertical section of the control mechanism taken on line 8—8 of Fig. 7.

As noted above, when the relay valve 36 is in its normal or lower extreme of travel, as shown in Fig. 8, it prevents the pressure fluid entering inlet 25 from gaining access to port 56 and rotor valve 37, consequently the shift of rotor valve 37 is not accompanied by rotation of the valve element 2, as there is no pressure fluid in port 56 to accomplish that result, and in order that rotor valve 37 may function, it is essential that relay valve 36 be shifted to the upper extreme of its vertical travel. When clamp-release valve 35 is shifted into stopping engagement with head 46 and pressure fluid is admitted into lifting port 47 as previously described, it flows into drilled passage 59, Figs. 7 and 9, which communicate with the space between the bossed face on the upper side of lower head 60 and the opposing lower face of relay valve 36, and, acting thereon as a piston, forces relay valve 36 upward until its upper end face comes into stopping engagement with the boss on the under side of upper head 61, and in this new position pressure fluid is then admitted to middle ring port 56 of rotor valve 37, flows to the rotor pressure chambers and rotates valve element 2 to the open position after it has been raised from its tapered seat in readiness for such turning movement.

From the above, it will be seen that relay valve 36 prevents delivery of pressure fluid to either the opening or closing passages to the rotor chambers until after the clamp-release valve has functioned to deliver pressure fluid to chamber A to raise the valve element from its wedging engagement in its seat, thus placing it in correct position for rotary movement in either the opening or closing directions. The total lifting force may be made very great to insure a positive release of the valve member 2 from its seat since, as noted above, a substantial part of that lifting force is neutralized when pressure fluid is admitted to the rotor chamber.

When, through the means and steps described, the valve element 2 reaches either limit of its rotational travel, the clamp-release valve must be positioned to relieve the chamber A from pressure and to pass pressure fluid to chamber B to force the valve element to its seat, i. e., to restore the clamp-release valve 35 to the position shown in Fig. 7. At the same time, the relay valve 36 must be restored to its illustrated position by introducing pressure fluid between the under face of the upper head 61 and the valve 36, by means of a passage 62 which extends between that space and the clamping port 48 of the clamp-release valve 35.

This action is effected automatically by means of ports 63, 64 which extend through that portion of the outer wall of valve element 2 which forms a part of the rotor chamber, the ports being circumferentially spaced by 90° and adapted to register with a radial port 65 in the casing 1 when the valve is in fully open and fully closed positions, respectively. The outer end of port 65 is plugged, and the port communicates with a passage 66 which is drilled through the casing 1 and head 6.

A pipe 67 connects the passage 66 to a port 68 which opens into the space between the valve chest head 46 and the valve 35. As the opposite end of the valve 35 is subject only to the fluid pressure in the exhaust passage 49, the valve 35 will be forced back to its normal position, as shown in Fig. 7, as soon as pressure fluid from the rotor chamber enters at port 68. Pressure fluid then flows, through clamping port 48 of the valve to the chamber B to force the valve member 2 to its seat, and fluid from chamber A is passed to exhaust passage 49 through the valve port 47. With the valve 35 restored to this position, the passages 59, 62 to the relay valve 36 are opened into the exhaust passage 49 and to the pressure fluid inlet, respectively, and the relay valve 36 therefore closes, shutting off the flow of pressure fluid to the rotor valve 37 and the rotor chamber.

The action just described takes place only when the valve chamber 2 reaches fully closed or fully open position and, since it may be desired to set the valve member 2 at some intermediate position, an auxiliary valve 69 is provided in a passage 70 which leads to a port 71 that opens into the valve chest of valve 35 adjacent the head 46. Normally, the valve 69 is closed and, to set the valve member at a partially open position, the lever 27 is pulled up or down, as the case may be, to set the valve member 2 in motion in the desired direction and valve 69 is opened when the valve member 2 reaches the desired position, thus shutting off the flow of pressure fluid to the rotor chamber and forcing the valve member 2 downward upon its seat.

An indicator pointer 72 is mounted upon the upper end of a shaft 73 which is mounted axially of and rotates with the valve member 2. The shaft extends downward through a gland 74 and stuffing box carried by the upper head 61 of the relay valve chest and has a radial shoulder engaging the lower face of the head 61. The shaft has a close turning and sliding fit within the relay valve 36 and in the lower head 60 which is extended downwardly and into the stuffing box and gland 60' of the upper head 6 of the main valve casing. This forms a water tight sheath for the shaft 73 and positively centers it to aline the lower splined end of the shaft with the matingly broached hub of a spider 75 that is secured to the upper hub 3 of the valve 2. The indicator shaft 73 therefore rotates with the valve 2, but the vertical movement of the valve is not communicated to the shaft.

To vent air from the valve when it is placed in service, valves 76 are provided at the top of the control casing 21, which valves communicate with the ring ports 47, 48, 57 and 58, Fig. 7. As these ports are in communication with all of the interior chambers of the valve below, all air within these chambers is driven upward by the entering pressure fluid when the vent valves 76 are opened to permit its escape.

The speed of clamping or releasing the valve element 2, and of its rotational movements of opening and closing may all be regulated by adjustment of the stop or speed regulating screws 80 which are threaded into the heads of the valve chests in which valves 35 and 37 are mounted.

Glands 81 and appropriate packing are provided to prevent any leakage of the pressure fluid around the regulating screws. As shown in Fig. 7, the valves 35, 37 seat against internal bosses on the valve chest heads at the ends of their range of movement, but any one of the screws 81 may be turned in to restrict the stroke of its associated valve, thus throttling the particular port adjacent that screw to reduce the pressure fluid flow therethrough and thereby reducing the speed of that particular portion of the cycle of operations which is effected by pressure fluid flow through that port.

As described and claimed in my copending application, provision is made for admitting air through ports 83 and automatic check valves (not shown) to break the vacuum normally formed within portions of the main conduit when the valve member 2 is partially open and water is flowing therethrough under high velocity.

When the valve is taken out of active service, the chamber A and all associated passages up to the port 47 in the control casing 21 may be drained by removal of plug 84 from the lower head 5 of the valve casing 1. This also drains the cavity in the center of the lower journal 3 through the passage 85. If the valve 2 is open, the chamber B and its associated passages up to the port 48 of control casing 21 are drained by removal of the plug 86 from casing 1, the drain port 87 in the wall of valve member 2 being then alined with the opening. When the valve 2 is closed, the drain port 87 opens into the down stream side of the main conduit. The drain port 87 is of comparatively small size and may therefore open continuously into the downstream side of the conduit when the valve is closed without materially affecting the pressure maintained in the chamber B by the pressure fluid. Four drilled holes 88 are equally spaced around the circumference of the outer cylindrical wall of the rotor chamber and level with its bottom face, these holes being so spaced as to register with a series of ports 89, with removable drain plugs 90, whether the valve member 2 be in fully closed or fully open position. Removal of drain plugs 90 drains all of the rotor chambers and the associated ports and passages up to and including ports 57, 58 of the control body. The remainder of the control body is automatically drained through the exhaust outlet 26.

Figure 12:
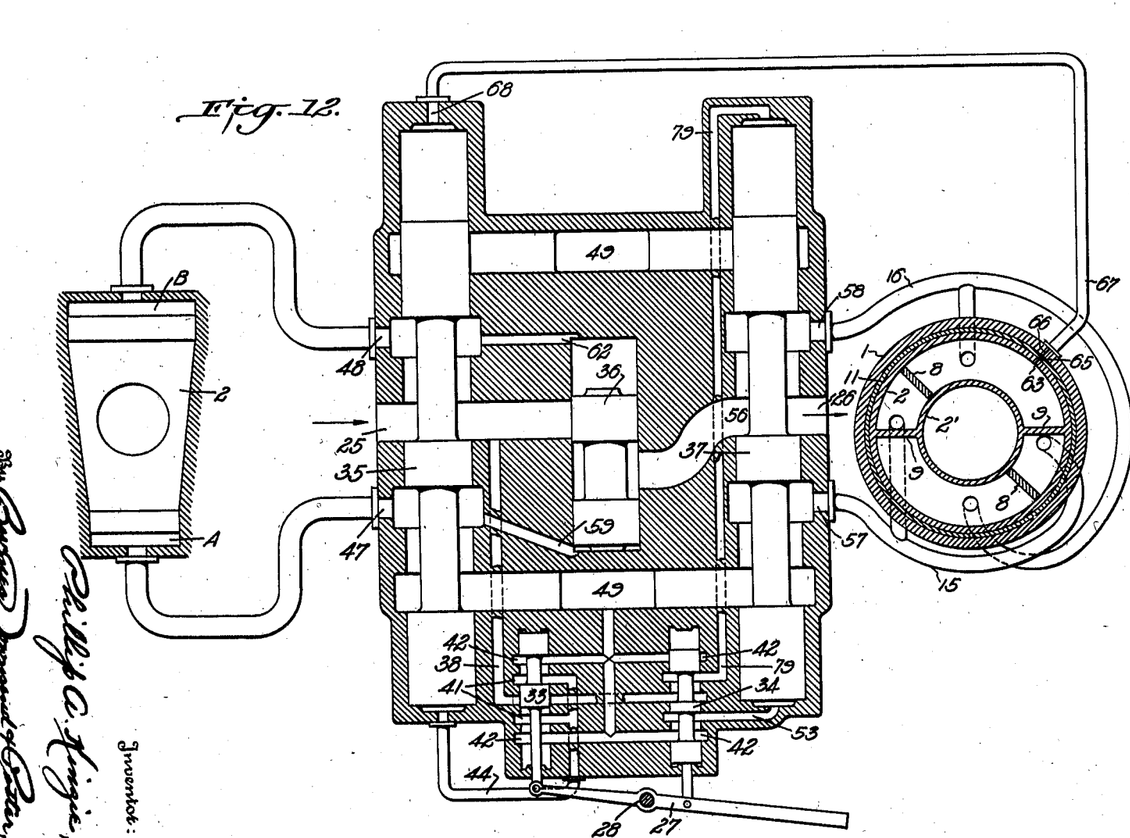
Fig. 12 is a diagrammatic view or schematic development of the valve elements, the pressure fluid controlled thereby, and the valve actuating chambers to which the flow of pressure fluid is regulated by the valve elements of the control mechanism.

A detailed description of the successive movements of the control valves to close the valve member 2, in response to a lowering of the lever 27, is believed to be unnecessary. In the schematic view, Fig. 12, the several valve elements of the control mechanism, and the passages connecting the valve elements to each other and to the pressure fluid chambers of the main valve, are all shown in a schematic way. The various parts are identified by the reference numerals employed for the corresponding elements of the other views, and a reading of the description of operation upon the schematic view will facilitate an understanding of the relationship and coordination of the physical embodiment of the invention which is shown in the other views.

As previously stated, the invention is not restricted to any particular size of valve, but provides valves of the plug type that are adapted for use under any conditions in which a direct manual adjustment of the valve is either impracticable or impossible. It will therefore be understood that the invention is not restricted to the specific embodiment herein illustrated and described, and that changes may be made in the several elements, their relative size, shape and relationship without departure from the spirit of my invention as set forth in the following claims.

I claim:

1. In a valve of the rotary plug type, a valve casing having a valve seat bore, a valve plug in said bore, said valve plug having spaced cylindrical portions joined by a wall and cooperating with said valve casing to define a rotor chamber, a series of impellers in said chamber and alternately secured to said casing and said valve plug, and means for introducing a pressure fluid into said chamber between the impellers of an adjacent pair, thereby to rotate said valve plug.

2. The invention as set forth in claim 1, wherein said valve plug and its seat include mating tapered sections terminating in mating cylindrical sections, and said rotor chamber is formed in part by and located wholly within the larger diameter cylindrical section of said valve plug, whereby fluid pressure within said chamber tends to force said valve plug to its seat, in combination with cooperating parts on said valve plug and casing defining a chamber for receiving pressure fluid to force said valve plug out of engagement with its seat.

3. In a rotary plug valve, a casing having a tapered valve seat bore, a tapered valve in said bore and normally wedged into engagement with its tapered seat, means for applying a force to said valve to release the same from engagement with its seat, and means for neutralizing a part of the releasing force and for rotating said valve, said last means comprising a fluid pressure motor including an annular rotor chamber having a pair of spaced cylindrical walls and one end wall all movable with said plug, an impeller blade secured to said plug, and an end wall carrying a fixed blade, said last end wall being secured to said casing.

4. In a valve of the rotary plug type, a valve casing having a fluid conduit therethrough and a transverse valve seat bore, a tapered valve plug in said bore and adapted for wedging engagement with its seat, opposed pressure fluid chambers in said casing for releasing said valve plug from and for clamping the same to its seat, a fluid pressure motor in said casing for rotating said valve plug, and a control mechanism, said mechanism including a control casing having a pressure fluid inlet and an exhaust fluid outlet, hollow flanges on said control casing for securing the same to said valve casing, the said hollow flanges constituting fluid passages alined with fluid passages in said valve casing, and control valve means in said casing for determining the flow of pressure fluid between said control casing and, respectively, the pressure fluid chamber and the motor of said valve casing.

5. In a rotary plug valve, a casing having a transverse bore including a tapered section terminating in cylindrical sections, a valve plug having a similar tapered section and cylindrical sections engaging the corresponding sections of said bore, heads closing the ends of said bore, chambers within said casing at opposite ends of said valve plug for receiving pressure fluid to lift said valve plug from or to force it into wedging engagement with its seat, and means providing a pressure fluid motor within the larger diameter cylindrical section of said valve plug and between said heads for rotating said valve plug.

6. In a rotary plug valve, a casing having a fluid conduit therethrough and a transverse valve seat bore, a valve plug in said bore and having a tapered section for wedging engagement with a portion of the wall of said bore, heads closing the opposite ends of said bore and spaced from the respective adjacent ends of said valve plug to provide opposed chambers for receiving pressure fluid, and cooperating means on one head and the adjacent end of said valve plug forming a pressure fluid motor for rotating said valve plug, and mechanism coincidentally operable to sequentially provide pressue fluid differential relative to the chambers and relative to the motor for axially and rotatively moving the valve plug in predetermined order, said mechanism comprising a control casing and a plurality of valves therein, and the fluid passages for transferring a pressure medium from the said control mechanism to the said chambers and motor as well as the pressure fluid passages for exhausting a pressure fluid from said chamber and motor to said control mechanism lying wholly within said valve casing and the control casing.

7. In a rotary plug valve, a casing having a fluid conduit therethrough, a transverse valve seat bore intersecting said conduit, said bore having a tapered intermediate section, a hollow valve within said bore and having an outer wall including a tapered section conforming to the tapered section of said valve seat, heads closing the ends of said bore; said valve having a flange cooperating with one end of its outer wall to define at least two walls of an annular rotor chamber, one of said heads cooperating with said flange and valve wall to complete the rotor chamber, and impeller blades secured alternately to the said head and to said valve, whereby pressure fluid may be introduced between the blades of an adjacent pair to rotate said valve.

8. In a rotary plug valve, the combination with a casing having a fluid conduit therethrough and a valve seat bore, a valve plug in said bore and normally wedged into engagement with its seat, of clamp-release means for moving said valve plug axially in any desired position within its range of angular adjustment to clamp it to and to release it from its seat, means for rotating said valve plug, an element for controlling the operation of said clamp-release means, an element for controlling the operation of said valve rotating means, and means always related with said control elements to actuate said clamp-release means to release the valve from its seat prior to the operation of said valve rotating means and to actuate said clamp-release means to clamp said valve to its seat after said valve rotating means is rendered inactive.

9. In a rotary plug valve, a casing having a tapered valve seat bore therein, a tapered valve plug in said bore, pressure fluid means for releasing said valve plug from and for forcing the same to its tapered seat, means for rotating said valve plug, and a single control means for successively actuating said pressure fluid means and valve rotating means in cycles including the successive steps of (a) energizing the pressure fluid means to release said valve plug from its tapered seat, (b) energizing said valve rotating means to rotate said valve plug to any desired position within its range of angular adjustment, and (c) deenergizing said valve rotating means and energizing said pressure fluid means to force said valve plug to its tapered seat.

10. In a valve of the rotary plug type, the combination with a valve casing having a fluid conduit therethrough, a transverse valve seat bore having a tapered section, and a tapered valve in said bore, of control mechanism including a pilot means and selector means inter-connected for simultaneous operation, means actuated by said pilot means for releasing said valve from its tapered seat, valve rotating means controlled in its direction of motion by the adjustment of said selector means, means actuated by said valve releasing means for energizing said valve rotating means, and automatic means operable at the completion of a predetermined rotary motion of the valve for deenergizing said valve rotating means and for forcing said valve into wedging engagement with its seat.

11. The invention as set forth in claim 10, in combination with auxiliary means operable prior to the actuation of said automatic means for deenergizing said valve rotating means and for forcing said valve into wedging engagement with its seat.

12. In a valve of the rotary plug type, the combination with a valve casing having a tapered seat, a rotary plug valve having a tapered surface for engagement with said seat, chambers for receiving pressure fluid to release said valve from and to clamp the same to its seat, and a fluid pressure motor for rotating said valve, of a control mechanism for regulating the flow of pressure fluid to said chambers and rotor, said mechanism including a selector valve for controlling the supply of pressure fluid to said motor to determine its direction of rotation, and a pilot valve for supplying pressure fluid to the valve releasing chamber when the selector valve is moved to supply pressure fluid to said motor.

13. In a rotary plug valve, the combination with a valve casing, a valve element therein and normally clamped in wedging engagement with its seat, a clamp and a release chamber for receiving pressure fluid to clamp said valve element to and to release it from its seat, and a pressure fluid motor for rotating said valve element, of a control mechanism including a casing having a pressure fluid inlet and an exhaust fluid outlet, a valve member in said control casing for determining the supply of pressure fluid to said motor, a release valve in said casing for supplying pressure fluid to said release chamber, relay means normally rendering said valve member inoperative to supply pressure fluid to said motor, and means controlled by the movement of said release valve for actuating said relay means to permit flow of pressure fluid to said motor.

14. In a valve, the combination with a valve casing, a valve element therein and normally clamped in wedging engagement with its seat, a clamp and a release chamber for receiving pressure fluid to clamp said valve element to and to release it from its seat, and a pressure fluid motor for rotating said valve element, of a control mechanism including a casing having a pressure fluid inlet and an exhaust fluid outlet, a clamp-release valve in said control casing for determining the flow of pressure fluid to and from said clamp and release chambers respectively, a rotor valve for controlling the supply of pressure fluid to said motor, a relay valve normally interrupting the flow of pressure fluid to said rotor valve, and means controlled by the movement of said clamp-release valve into release position to actuate said relay valve to establish a pressure fluid flow to said rotor valve.

15. The invention as set forth in claim 14, wherein means is actuated by movement of said clamp-release valve into clamp position to restore said relay valve to its normal position, and means actuated upon a predetermined rotation of said valve element for returning said clamp-release valve to clamp position.

16. In a rotary plug valve, the combination with a valve casing, a valve element therein and normally clamped in wedging engagement with its seat, a clamp and a release chamber for receiving pressure fluid to clamp said valve element to and to release it from its seat, and a pressure fluid motor for rotating said valve element, of a control mechanism including a casing having a pressure fluid inlet and an exhaust fluid outlet, a clamp-release valve determining the flow of pressure fluid to and from said clamp and release chambers respectively, a rotor valve for controlling the supply of pressure to said motor, and control means for moving said clamp-release valve to release position simultaneously with the movement of said rotor valve into position to supply pressure fluid to said motor, means delaying the flow of pressure fluid to said motor until said clamp-release valve delivers pressure fluid to said release chamber to release said valve member from its seat, and automatic means for restoring said clamp-release valve to clamp position when said valve member reaches a predetermined position.

17. The invention as set forth in claim 16, wherein said clamp-release and rotor valves are balanced piston valves located in valve casings into which pressure fluid may be introduced to move the said valves, and said control means includes a pilot valve for controlling the actuating of said clamp-release valve, a selector valve for controlling the movement of said rotor valve into one of two alternative positions in accordance with the desired direction of rotation of said valve element, and means connecting said pilot valve and selector valve, said connecting means moving said pilot valve into position to actuate said clamp-release valve to release position when said selector valve is moved to effect rotation in either direction of said valve member.

18. The invention as set forth in claim 16, in combination with means operable to restore said clamp-release valve to clamp position prior to the actuation of said automatic restoring means.

19. In a valve, a casing element, a valve element rotatable therein, means on one of said elements forming one end wall and the two cylindrical walls of an annular rotor chamber of rectangular cross-section, a ring carried by the other element to form the second end wall of said chamber, and impellers detachably secured to said end walls.

20. A valve as claimed in claim 19, wherein said impellers are all of substantially identical construction, and each includes a seal bar recessed into the adjacent face of the impeller and the chamber wall to which the impeller is secured.

21. In a valve, a casing having a conduit therethrough and a bore intersecting said conduit, said bore having a tapered section terminating in cylindrical end sections, a hollow valve plug within said bore and having an exterior wall conforming to the shape thereof, a cylindrical wall forming a fluid conduit section in said plug, means including a transverse web securing said plug walls to each other, an angular flange secured to the larger end of said plug and cooperating with the adjacent end of said exterior wall to form an annular recess, a head on said casing and closing said recess to form a chamber, and impellers secured respectively to said head and to said valve plug.

22. In a valve, a hollow valve plug comprising an exterior wall having a central tapered section terminating in two cylindrical end sections, an angular flange within one cylindrical section and cooperating therewith to form an annular recess, a cylindrical wall extending transversely of said central section to form a passage through said plugs, and alined transverse webs extending between said cylindrical wall and said exterior wall.

PHILLIP A. KINZIE.